Feb. 16, 1932. P. A. RICHARD 1,845,519
COLOR PHOTOGRAPHY
Original Filed Nov. 18, 1926
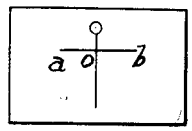
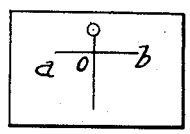
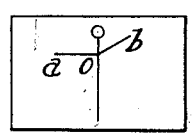
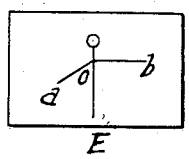
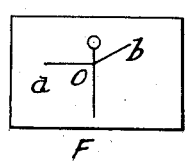
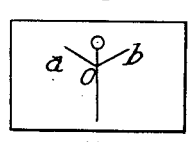
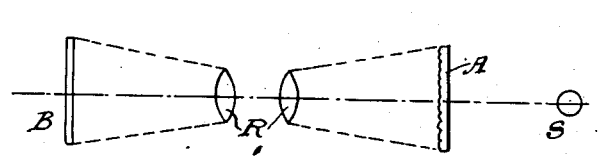
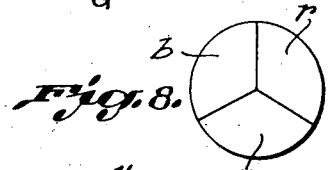
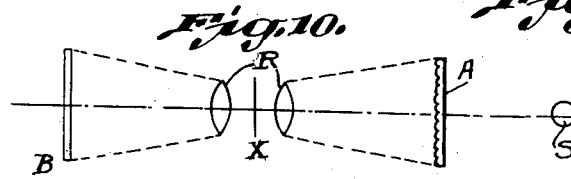
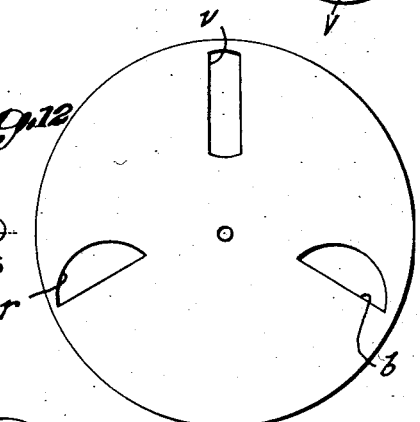
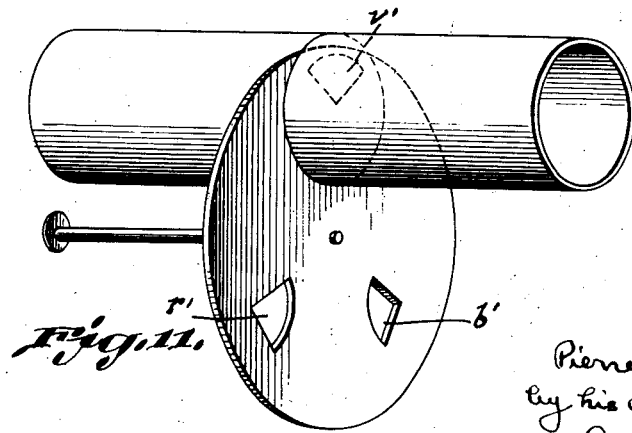
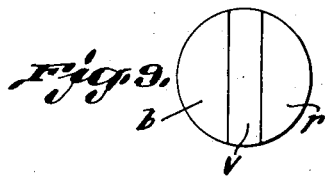
Inventor
Pierre Abel Richard
by his attorney
Arthur Wright Patented Feb. 16, 1932

1,845,519

UNITED STATES PATENT OFFICE

PIERRE ABEL RICHARD, OF PARIS, FRANCE, ASSIGNOR, BY MESNE ASSIGNMENTS, TO KELLER-DORIAN COLORFILM CORPORATION, OF NEW YORK, N. Y., A CORPORATION OF DELAWARE

COLOR PHOTOGRAPHY

Original application filed November 18, 1926, Serial No. 149,166, and in France December 19, 1925. Divided and this application filed June 28, 1929. Serial No. 374,599.

In color cinematography, the principal methods operate in two ways:

1. Picture-taking is effected with three objectives, each having a colored filter, one red, another green, and the third blue; the film advances for each group of three images, so that groups of three images taken at the same time are thus obtained, representing three selected monochrome images.

This method of procedure has the inherent defect that in picture-taking with three objectives, each object to be photographed is viewed from three different points. Hence, when the three monochrome images are projected on the screen in the form of a single image, they cannot be superposed perfectly because they were taken at three different angles, and parallax will occur.

2. Picture-taking is effected with a single objective, in front of which are successively passed a red filter, a green filter and a blue filter, thus producing three monochrome images which, however, were not taken at the same time. It follows, therefore, that the movements registered will not be superposable for the three colors.

I have ascertained that in certain cases it is important, in projection, to make use of the same projection system as used in the above processes, but necessarily omitting all the defects specified. These defects will be overcome if the three monochrome images are taken at the same time with a single objective as a single image, like the image of the Keller-Dorian color process (using goffered film), which is constituted by the juxtaposition of three monochrome images. Hence, I start out, in the first place, by using goffered film for the picture-taking.

In the accompanying drawings:

Figures 1 to 6 are diagrams explanatory, to some extent, of the theory of cinematography in colors in relation to the formation of parallactic images in projection;

Fig. 7 is a diagrammatic view of an apparatus in which the color-selecting filter is not included in the optical system or device;

Figs. 8 and 9 are diagrams of two forms of filters which may be used;

Fig. 10 shows the apparatus of Fig. 7 with a suitable mechanical device interposed in the objective of the optical system.

Fig. 11 is a perspective view of the shutter arrangement for producing the different colored images, showing shutter openings corresponding respectively to the red, green and blue color areas of the three colored light filter—the circle is divided into three 120° segments for the respective colors; and Fig. 12 is an elevation of the shutter showing shutter openings corresponding respectively to the red, green and blue color areas when using a light filter divided into three color areas as shown in Fig. 9.

Referring to Figs. 1-6, Fig. 1 represents, by way of example, a subject to be photographed having two swinging arms $aO$ and $Ob$ capable of an angular movement of 180°; in Fig. 2, the subject is supposed to be stationary, whereas in Fig. 3 it is assumed to be in motion. In either event, and in the case of trichrome photography, three separate images, each of a different color of the selecting filter, must be obtained; and if these images are identical, they will exactly superpose on the screen, and the final or composite image will be entirely free from parallactic fringes. On the other hand, if the three monochrome images are not identical, as indicated in Figs. 4, 5 and 6, then they cannot be exactly superposed and the final colored images will have parallactic fringes. In the figures last named, E indicates the image taken through the blue filter, F that taken through the green filter, and G the one taken through the red filter.

Fig. 7 represents, diagrammatically, an arrangement in which a goffered film A of the Keller-Dorian type is illuminated by means of a suitable light source S; a symmetrical optical system R being interposed between the goffered film A and a non-goffered film B. The aforesaid Keller-Dorian film, as is well known, is provided with a multitude of tiny lenticular projections or elements on its front face, and carries on its rear face a layer of sensitized emulsion.

The color filter, which is located at the optical center of the system R, is illustrated in Figs. 8 and 9 which show two different forms of the trichrome type. In both instances, the filter comprises different distinct portions $b$, $v$ and $r$ which are respectively colored blue, green and red; and in Fig. 8 these portions have the form of equal sectors, whereas in Fig. 9 they are formed as segments or bands.

The theory on which color photography on goffered film is based, is that the respective part of the emulsion behind each microsopic lenticular element of the goffered film receives the image of the trichrome filter arranged in the diaphragm of the objective; stated otherwise, the protographic image is distributed over as many minute zones as there as lenticular elements, and each of these tiny zones is itself divided into as many zones as there are colors in the filter in the diaphragm of the objective. Consequently, there will be found, on an image of this film, three monochrome images, clearly distinct but intimately united or blended by means of the lenticular elements, taken by a single objective and at the same moment. Owing to this special feature, which has been obtained by one and the same objective, the objectionable parallax which is present in other processes involving seaparated monochrome images is completely eliminated.

It is a question, now, of utilizing the image obtained on the goffered film and of recovering the three monochrome images which it contains by reproducing them individually as separate images in accordance with the projecting systems of other processes. To obtain this result, it is possible to operate in two ways. There is no need to specify whether the goffered film bearing the image is a negative or a positive, as both can be used. If it is a positive, the film bearing the separate monochrome images which is obtained will, quite naturally, be a negative, and from this negative copies can be made. On the other hand, if the film in question is a negative, positive monochrome images will be obtained directly.

It has already been stated that images photographed on goffered films of the Keller-Dorian type can be copied, and that the three monochrome images which are intimately united or blended on such film can be separated into three distinct monochrome images on a panchromatic film. However, highly important advantages can also be obtained by using ordinary film for copying purposes.

Figure 10 shows diagrammatically how the reproduction of the image taken on goffered film is effected on non-goffered film in order to obtain the desired separate monochrome images. In the case of trichrome images, for example, the film B will be advanced three image-spaces, while film A is advancing only one image-space. To obtain the separation of the three monochrome images, which are superposed on the film A, there is placed in the diaphragm of the optical system R a solid disk X, portions of which have been cut out corresponding to the sectors or the segments of the trichrome filter that was used in taking the pictures on the goffered film. Projection in monochrome on film B then requires that disk X be masked in such a way as to permit the light to pass through each of the cut-out parts of the disk in succession, but through only one at a time.

Fig. 12 shows the disk shutter having openings $r$, $v$ and $b$ corresponding in shape to the color areas of the light filter when using a light filter divided as shown in Fig. 9.

Fig. 11 shows the disk shutter constructed the same as the shutter showing in Fig. 12 except that in this instance segmental openings $r'$, $v'$ and $b'$ are utilized, each forming a 120° division of the circle for the respective red, green and blue light areas of the color filter when the latter is divided into three 120° segments.

The aforesaid disk can be operated mechanically or in any other suitable manner, and each cut-out portion or sector thereof will pass successively in front of each image of the goffered film, while the film whereon the copying is effected is advanced at each change of sector. The colored filter can be entirely omitted, if desired, in view of the fact that the operation consists simply in copying the three black and white images intimately blended or united on goffered film in the form of three distinct or separated, corresponding images in black and white on ordinary film.

The foregoing is also applicable in the case, say, of a bichrome film, in which instance there will be two filters. Two images will be obtained, one colored blue-green and the other red-orange.

The present application is a division of my prior application, No. 149,166, filed November 18, 1926, Patent No. 1,750,358, wherein the use of panchromatic film for copying purposes is specifically claimed.

I claim as my invention:

1. In the production of motion pictures in color, the steps of photographing the objects on a moving picture film which is goffered on its front face with a multitude of minute lenticular projections while subjecting the light rays to a polychrome filtering action so as to select the colors of the rays which reach the film and thereby form images in polychrome corresponding to the filtered colors; and thereafter reproducing the polychrome images of the goffered film, while the latter is illuminated, on a non-goffered film, and advancing the non-goffered film a plurality of image-spaces for each image-space of the goffered film, the actual number depending on the number of different color values of the goffered film, while subjecting the rays passing through said goffered film to the action of a disk interposed in the objective of the optical system and having apertures corresponding in form and dimensions to the sectors of the color filter used in taking the pictures on the goffered film, and masking said disk in such a way as to permit the light to pass through only one of its apertures for each image of the non-goffered film; thereby to obtain on said non-goffered film a plurality of separate monochrome images of each polychrome image of the goffered film corresponding in number to the number of color values of said polychrome images.

2. In the production of motion pictures in color, the steps of photographing the objects on a moving picture film which is goffered on its front face with a multitude of minute lenticular projections, while subjecting the light rays to the action of a trichrome filter so as to select the colors of the rays which reach the film and thereby form trichrome images corresponding to the filtered colors; and thereafter reproducing the trichrome images of the goffered film, while the latter is illuminated, on a non-goffered film, and advancing the non-goffered film three image-spaces for each image-space of the goffered film, while subjecting the rays passing through said goffered film to the action of a disk interposed in the objective of the optional system and having three apertures corresponding in form and dimensions to the sectors of the trichrome filter used in taking the pictures of the goffered film, and masking said disk in such a way as to permit the light to pass through only one of its apertures for each image of the non-goffered film; thereby to obtain on said non-goffered film three separate monochrome images of each trichrome image on the goffered film.

3. In the production of motion pictures in colors, the steps of photographing the objects on a moving picture film which is goffered on its face with a multitude of minute lenticular projections while subjecting the light rays to a polychrome filtering action so as to select the colors of the rays which reach the film and thereby form images in polychrome corresponding to the filtered colors; and thereafter reproducing an image from the goffered film, while the latter is illuminated, on a non-goffered film, and advancing the non-goffered film for each image-space of the goffered film a number of times depending on the number of different color values to be taken from the goffered film, while subjecting the rays passing through said goffered film to the action of a disk interposed in the objective of the optical system and having apertures corresponding in form and dimensions to the sectors of the color filter used in taking the pictures on the goffered film, and masking said disk in such a way as to permit the light to pass through only one of its apertures for each image of the non-goffered film; thereby to obtain on said non-goffered film a monochrome image from the polychrome image of the goffered film.

4. In the production of motion pictures in colors, the steps of photographing the objects on a moving picture film which is goffered on its face with a multitude of minute lenticular projections while subjecting the light rays to a polychrome filtering action so as to select the colors of the rays which reach the film and thereby form images in polychrome corresponding to the filtered colors, and thereafter reproducing an image from the goffered film, while the latter is illuminated, on a non-goffered film, and advancing the non-goffered film for each image-space of the goffered film a number of times depending on the number of different color values to be taken from the goffered film, while subjecting the rays passing through said goffered film to the action of a device interposed in the objective of the optical system and having apertures corresponding in form to the sectors of the color filter used in taking the pictures on the goffered film, in such a way as to permit the light to pass through only one of its apertures for each image of the non-goffered film, thereby to obtain on said non-goffered film a monochrome image from the polychrome image of the goffered film.

In testimony whereof I affix my signature.

PIERRE ABEL RICHARD.